(12) United States Patent
Rayner

(10) Patent No.: US 6,389,340 B1
(45) Date of Patent: May 14, 2002

(54) VEHICLE DATA RECORDER

(76) Inventor: Gary A. Rayner, 7980 #C Sevan Ct., San Diego, CA (US) 92123

( * ) Notice: Subject to any disclaimer, the term of this patent is extended or adjusted under 35 U.S.C. 154(b) by 0 days.

(21) Appl. No.: 09/405,857

(22) Filed: Sep. 24, 1999

Related U.S. Application Data

(63) Continuation-in-part of application No. 09/020,700, filed on Feb. 9, 1998, now abandoned.

(51) Int. Cl.[7] ............................................. G06F 19/00
(52) U.S. Cl. .......................... 701/35; 340/438; 348/148
(58) Field of Search .............................. 701/29, 33, 35; 340/438, 439, 937; 348/143, 148, 155; 396/429, 502

(56) References Cited

U.S. PATENT DOCUMENTS

| | | | |
|---|---|---|---|
| 4,638,289 A | * 1/1987 | Zottnik | 701/35 |
| 4,987,541 A | * 1/1991 | Levente et al. | 701/35 |
| 5,100,095 A | 3/1992 | Haan et al. | |
| 5,178,448 A | 1/1993 | Adams et al. | |
| 5,262,813 A | * 11/1993 | Scharton | 396/502 |
| 5,327,288 A | 7/1994 | Wellington et al. | |
| 5,446,659 A | * 8/1995 | Yamawaki | 701/35 |
| 5,497,419 A | * 3/1996 | Hill | 348/143 |
| 5,523,811 A | 6/1996 | Wada et al. | |
| 5,680,123 A | * 10/1997 | Lee | 340/937 |
| 5,815,093 A | * 9/1998 | Kikinis | 340/937 |
| 6,141,611 A | * 10/2000 | Mackey et al. | 701/35 |
| 6,144,296 A | * 11/2000 | Ishida et al. | 701/35 |
| 6,163,338 A | * 12/2000 | Johnson et al. | 348/148 |

FOREIGN PATENT DOCUMENTS

| | | |
|---|---|---|
| EP | 0 840 270 A2 | 5/1998 |
| JP | 58085110 | 5/1983 |
| JP | 62091092 | 4/1987 |
| JP | 62166135 | 7/1987 |
| JP | 02056197 | 2/1990 |
| JP | 04257189 | 9/1992 |
| JP | 05137144 | 6/1993 |
| JP | 08124069 | 5/1996 |
| JP | 09163357 | 6/1997 |
| JP | 09272399 | 10/1997 |
| JP | 10076880 | 3/1998 |

\* cited by examiner

*Primary Examiner*—Gary Chin
(74) *Attorney, Agent, or Firm*—Calif Tervo

(57) ABSTRACT

A self-contained device for capturing video imagery in response to a triggering event may include a mirror and be mounted to a vehicle windshield in place of a conventional rear-view mirror. The device includes a housing in which the electronics and related elements of the invention are contained. These elements include one or more data sensors, at least one of which is an image sensor,. Also included are a data sensor circuit and a capture circuit. The data sensor circuit responds to the triggering event, and may include data sensors coupled to vehicle systems such as a speedometer, tachometer, brake, turn signals or the like, or other data sensors such as an accelerometer or a vehicle position sensor. The triggering event may be, for example, a sudden change in acceleration indicative of an impending collision, or it may be a change in the signal provided by any such data sensor, including the image sensor. The capture circuit is coupled to the image sensor and captures a signal representing the video imagery by recording it in a digital memory, by transmitting it to a remote location, or by other suitable means. The capture circuit terminates capture of the signal in response to the data sensor circuit sensing a triggering event. The captured data thus describe circumstances leading up to the time of the triggering event. The data can be analyzed to help police, insurance or other investigative personnel understand those circumstances.

41 Claims, 2 Drawing Sheets

VEHICLE DATA RECORDER

CROSS-REFERENCE TO RELATED APPLICATION

This is a continuation-in-part of application Ser. No. 09/020,700, filed Feb 9,1998, titled "SEQUENTIAL IMAGE STORAGE SYSTEM WITH PREEVENT HISTORY" now abandoned.

BACKGROUND OF THE INVENTION

1. Field of the Invention

The present invention relates generally to devices for recording imagery and other data during operation of a vehicle and, more specifically, to a device that stores such data during the time interval surrounding a triggering event such as detection of an impending vehicle collision.

2. Description of the Related Art

Various recorders have been used to gather and retain data obtained from vehicle sensors. One well-known such recorder is the in-flight data recorder and cockpit voice recorder, sometimes referred to as the "black box" recorder, typically carried by commercial and military aircraft. These devices record certain operating parameters of the aircraft, as well as the voices of the operators, and have found use in setting maintenance schedules, or to assist in determining the cause of an accident. Data recorders have been known to use magnetic tape or solid-state storage devices.

The ever-increasing use of motor vehicles has created a complex and expensive system of determining liability for the damages which result from accidents. Inevitably, it is difficult to reconstruct the events leading up to, and resulting from, the accident impact, as witness testimony is often unreliable and contradictory, and the physical remains generally do not contain sufficient evidence of the actual incident. A device to gather and record data from a wide range of operating parameters would be of great use, provided that the data covered the time leading up to the accident, as well as the accident itself, and that the data was secure so that it could be admitted in proceedings to determine liability.

Efforts have been made to construct recording devices which are lighter, more versatile, and more secure in their data storage. For example, U.S. Pat. No. 5,497,419 to Hill discloses a device for recording sensor data which included provisions to compress and decompress data, as well as to encrypt the stored data to enhance the integrity of the data. U.S. Pat. No. 5,056,056 to Gustin discloses a device to record various analog signal inputs occurring before and after a triggering event. U.S. Pat. No. 5,581,464 to Woll et al. discloses an event recording apparatus to monitor the operational parameters of a vehicle. U.S. Pat. No. 5,262,813 to Scharton discloses a device to trigger the operation of a camera mounted in a vehicle upon the occurrence of an impact. U.S. Pat. No. 5,499,182 to Ousborne also discloses an recording apparatus to monitor the operational parameters of a vehicle. U.S. Pat. No. 5,311,197 to Sorden et al. discloses a device to trigger the operation of a location reporting device in a vehicle upon the occurrence of an event such as an impact. Each of these devices has certain limitations which reduce its applicability as a secure storage device for recording numerous sensor inputs occurring before and after a triggering event.

A disadvantage of some prior vehicle data recording devices is that they are not fully integrated or self-contained. Rather, they include a data recorder located remotely from and coupled by electrical cables to the video camera or other sensor that obtains the data to be recorded. Another disadvantage of some prior vehicle data recording devices is that they are not located in the vehicle cabin at a position that is both efficient for data-gathering and convenient to use. It would be desirable to provide a self-contained, compact, conveniently and efficiently located recording device that records video or other types of data during a time interval preceding a triggering event, such as a detection of an impending accident. These problems and deficiencies are clearly felt in the art and are solved by the present invention in the manner described below.

SUMMARY OF THE INVENTION

The present invention relates to a self-contained vehicle-mounted device for capturing video imagery in response to a triggering event. The device includes a housing in which the electronics and related elements of the invention are contained. These elements include one or more data sensors, at least one of which is an image sensor, such as a charge-coupled device, that senses visible light, infrared radiation or other optical phenomena representing video imagery. Also included are a data sensor circuit and a capture circuit. The data sensor circuit responds to the triggering event, and may include data sensors coupled to vehicle systems such as a speedometer, tachometer, brake, turn signals or the like, or other data sensors such as an accelerometer or a vehicle position sensor. The triggering event may be, for example, a sudden change in acceleration indicative of an impending collision, or it may be a change in the signal provided by any such data sensor, including the image sensor. The capture circuit is coupled to the image sensor and captures a signal representing the video imagery by recording it in a digital memory, by transmitting it to a remote location, or by other suitable means. The capture circuit terminates capture of the signal in response to the data sensor circuit sensing a triggering event. Note that data describing circumstances leading up to the time capture was terminated will have been captured. The data can be analyzed to help police, insurance or other investigative personnel understand those circumstances. In some embodiments of the present invention the device may continue to capture data for a predetermined time interval after the triggering event.

The device is mounted in the vehicle cabin a manner that provides a clear field-of-view for the image sensor. For example, it can be mounted on the windshield or on the dashboard of the vehicle, with the image sensor directed either forwardly toward action occurring on the other side of the windshield or rearwardly toward action occurring in the vehicle cabin. In some embodiments of the present invention, the device may include two such image sensors, one directed forwardly and the other rearwardly.

In a particularly advantageous embodiment of the invention the device is integrated with a rear-view mirror. In other words, the housing is similar in size and shape to that of a conventional automotive rear-view mirror assembly and includes, in addition to the elements described above, a mirror and other features commonly included in conventional automotive rear-view mirrors. In such embodiments, the device is mounted to the windshield or a surrounding area of the vehicle in the manner of a conventional rear-view mirror.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF PREFERRED EMBODIMENTS

Figure 1:
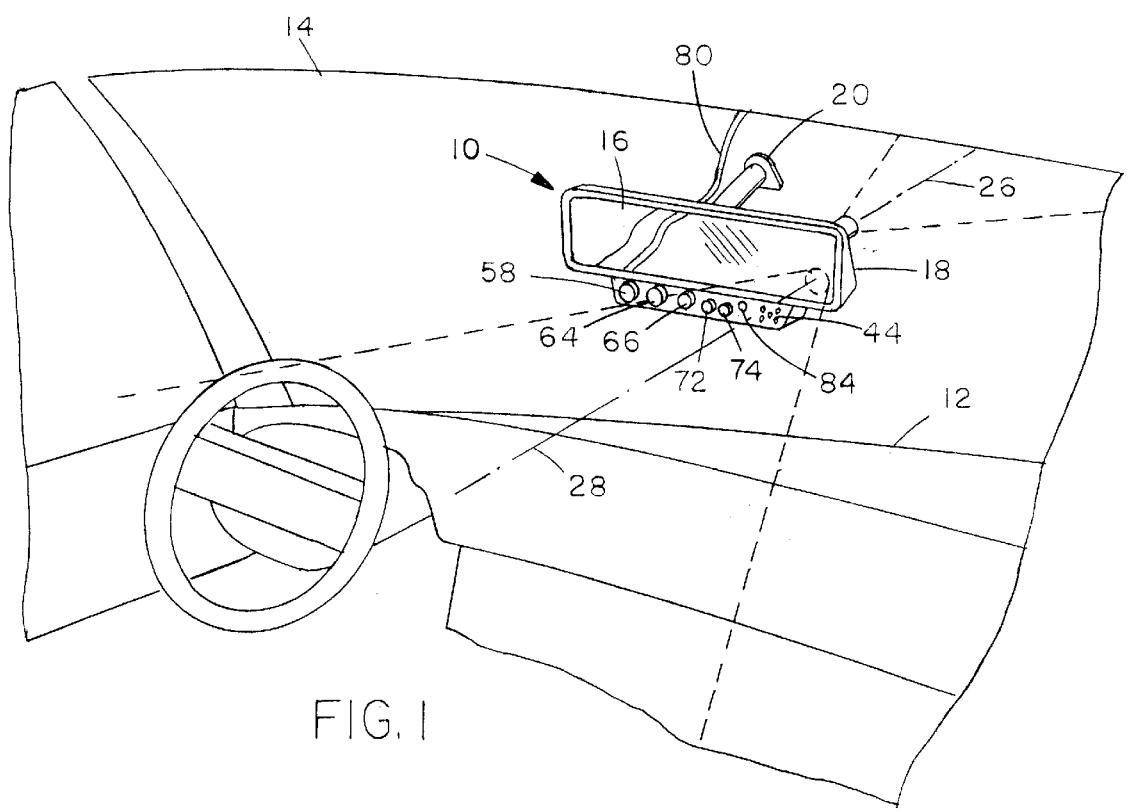
FIG. 1 is a perspective view of a rear-view mirror vehicle data recorder device of the present invention mounted on an automobile windshield.

As illustrated in FIG. 1, a rear-view mirror data recorder device 10 is mounted in the cabin of an automobile 12. Specifically, in this embodiment of the invention it is mounted to the windshield 14 of automobile 12 in the manner of a conventional rear-view mirror. Like a conventional rear-view mirror, it includes a generally elongated mirror 16 that is mounted to windshield 14 with mirror 16 and its axis of elongation generally parallel to windshield 14. (They are generally parallel, but not precisely parallel, because windshield 14 has some curvature, and because recorder device 10 is pivotally mounted to provide limited two-axis adjustability, as in a conventional rear-view mirror.) Device 10 has a housing 18 with a mounting bracket 20. Mounting bracket 20 is adhesively mounted to windshield 14 in the manner of a conventional rear-view mirror. Although in the illustrated embodiment device 10 is mounted in this manner, other embodiments of the device can alternatively be mounted to the cabin roof immediately above windshield 14 in the same manner in which other types of rear-view mirrors are conventionally mounted. Similarly, as discussed further below, other embodiments of the device can be mounted to windshield 14 in any other suitable manner and, indeed, can be mounted in other suitable locations inside the vehicle cabin.

Figure 3:
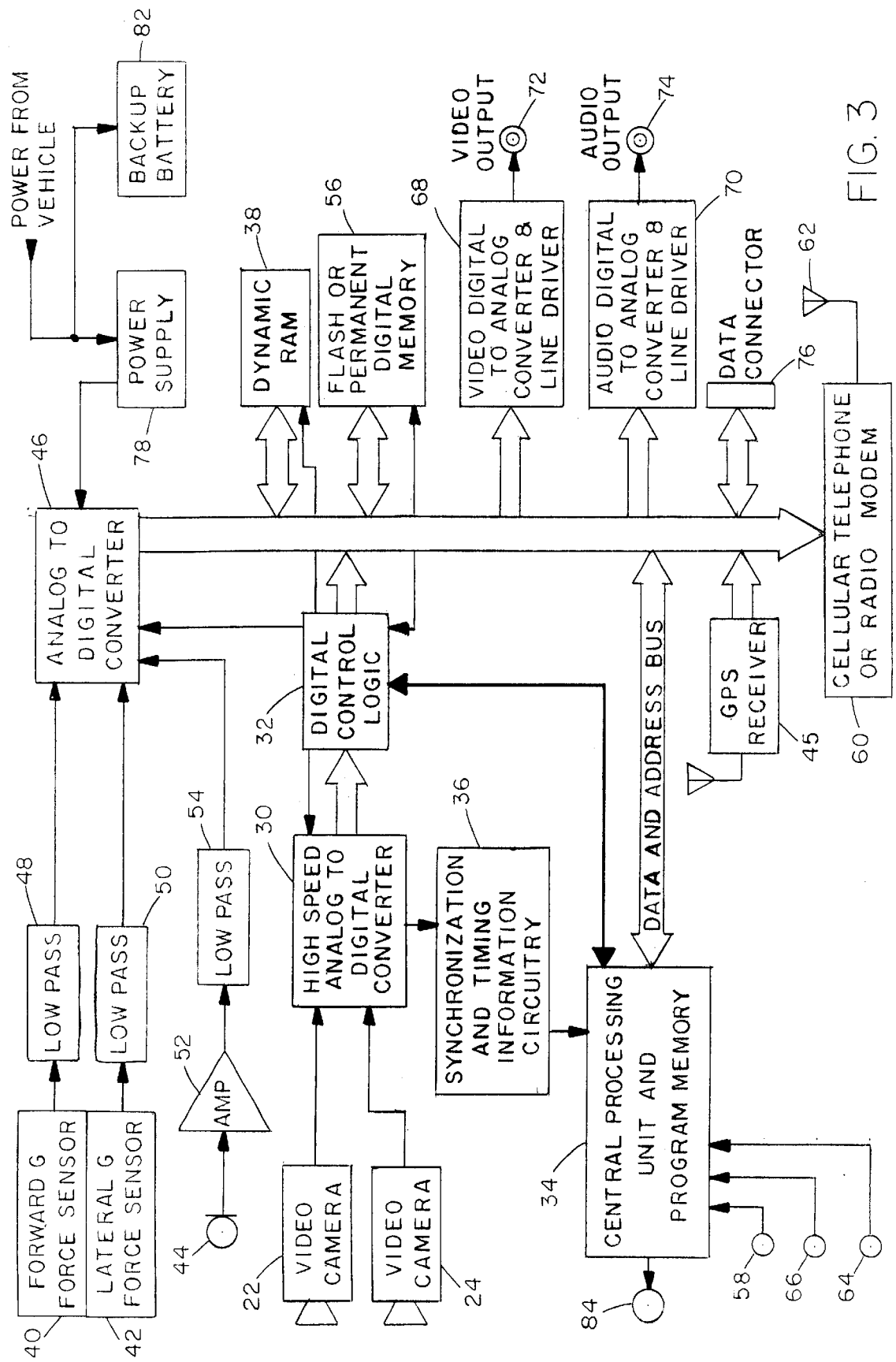
FIG. 3 is schematic block diagram of the vehicle data recorder device.

The electronics and associated elements of device 10 that are contained within housing 18 are illustrated in FIG. 3. Two video cameras 22 and 24, which are preferably charge-coupled device (CCD) or CMOS silicon sensor arrays, generate signals corresponding to video imagery. Referring briefly again to FIG. 1, camera 22 is mounted in housing 18 with its optical axis 26 directed forwardly with respect to vehicle 12, and camera 24 is mounted in housing 18 with its optical axis 26 directed rearwardly with respect to vehicle 12. Both axes 24 and 26 are thus generally aligned with the direction of travel of vehicle 12 and perpendicular to windshield 14. The fields-of-view of cameras 22 and 24 are indicated by dashed lines bounding the angles bisected by axes 24 and 26, but the dashed lines are for purposes of illustration only and are not intended to accurately depict the true fields-of-view, which would preferably cover the entire area ahead of vehicle 12 and the entire cabin area. The small circular aperture portion of mirror 16 through which axis 28 extends, indicated in dashed line, is preferably half-mirrored so that it appears to be mirrored to an observer, yet transmits light to camera 24. Nevertheless, in other embodiments of the device this portion may be transparent and unmirrored.

Returning to FIG. 3, a high-speed analog-to-digital (A/D) converter 30 digitizes the signals produced by cameras 22 and 24 and multiplexes them onto a digital data bus via digital control logic 32. Device 10 operates under the control of a central processing unit 34. Central processing unit (CPU) 34 may include a microprocessor, microcontroller or similar device and associated program memory. CPU 34 is programmed to perform the functions described in this specification. Because the descriptions of these functions below are sufficient to enable any person skilled in the art to which this invention relates to program CPU 34, program code and the manner in which it is programmed are not described in this specification. CPU 34 is synchronized to A/D converter 30 via synchronization and timing information circuitry 36.

Under control of CPU 34, digital signals representing the video imagery are stored in dynamic random-access memory (DRAM) 38 that is configured as a continuous-loop buffer. CPU 34 or associated address counter circuitry defines the continuous-loop scheme by employing wrap-around memory addressing, in which the highest memory location in a predetermined addressing sequence is adjacent or next to the lowest. Incoming digitized data signals are written to memory locations in DRAM 38 in accordance with the addressing sequence until all allocated locations have been written to, at which time the data signals stored at the next location in the sequence are overwritten with further incoming data signals.

Device 10 includes sensors in addition to cameras 22 and 24, including a forward accelerometer or G-force sensor 40, a lateral accelerometer or G-force sensor 42, a microphone 44, and a global positioning system (GPS) receiver 45. G-force sensors 40 and 42 are coupled to another A/D converter 46 via low-pass filters 48 and 50, respectively. Microphone 44 is coupled to A/D converter 46 via an amplifier 52 and another low-pass filter 54. G-force sensor 40 is mounted with respect to vehicle 12 in an orientation in which it is sensitive to changes in acceleration in a direction parallel to the direction of travel of the vehicle. Such changes may be indicative, for example, of a collision or sudden braking before a collision with a vehicle in front of or to the rear of vehicle 12. G-force sensor 42 is mounted with respect to vehicle 12 in an orientation in which it is sensitive to changes in acceleration in a direction perpendicular or lateral to the direction of travel of the vehicle. Such changes may be indicative, for example, of a vehicle colliding with the side of vehicle 12. Microphone 44, being integrated within enclosure 18 (see FIG. 1), is particularly sensitive to sounds occurring inside the cabin of vehicle 12, such as the voices of the driver and any passengers. GPS receiver 45 receives GPS satellite signals and determines from them the geographical position of vehicle 12. GPS receiver 45 and its antenna 47 are, like all other electronics and associated elements described above, disposed inconspicuously and securely inside housing 18. This location harmonizes with the location of device 10 on windshield 14 or nearby because radio frequency energy emanating from satellites above vehicle 12 penetrate windshield 14 more readily than metallic portions of vehicle 12. Under control of CPU 34, A/D converter 46 multiplexes and digitizes the signals produced by these sensors. The digitized sensor data are stored in DRAM 38 along with the digital signals representing the video imagery.

CPU 34 monitors the digitized signals representing the acceleration data to which G-force sensors 40 and 42 are responsive. If CPU 34 determines that the acceleration data exceed a predetermined threshold that is believed to be indicative of a collision or other event that would warrant investigation, it copies data from the buffer memory to a more permanent non-volatile memory 56, such as Flash memory. Memories 38 and 56 thus together define a two-tier system, in which the first tier records data in a continuous-loop fashion, and the second tier provides more permanent storage for data in the first tier in response to a triggering event. Data stored in memory 56 in accordance with this scheme are not overwritten unless the entire system is reset by an operator. Preferably, device 10 includes security measures to prevent inadvertent or unauthorized resetting, such as placing the button (not shown) or other sole means for resetting device 10 inside enclosure 18 or in another relatively inaccessible location.

Although in the illustrated embodiment a change in acceleration data that exceeds a predetermined threshold is defined as the triggering event that causes CPU 34 to terminate data acquisition and copy the contents of DRAM 38 to memory 56, in other embodiments a change in any other monitored sensor signal can similarly be defined as the triggering event. Also, although data acquisition can be terminated upon occurrence of the triggering event, in other embodiments data acquisition may continue after occurrence of the triggering event for some predetermined time interval. Thus, so long as a sufficient amount of pre-event data are retained and not overwritten, additional frames of video data or other sensor data can be gathered during and after the collision and stored in memory 56 following the pre-event data.

Multiple data acquisition rates are accommodated by sampling and recording the data streams at different rates. For example, the data stream from microphone 44 can be sampled at 15.625KHz or 15,625 samples per second. G-force sensors 40 and 42 can be sampled at 100 to 700 samples per second. The actual recording rate for such data could simply record the maximum G-force experienced, e.g. four times per second. The image data stream will generally be sampled at the slowest rate, typically ranging from one to 60 samples per second, although four times per second is believed to provide sufficiently useful information for accident investigators.

The data acquisition rate will also affect the amount of time data can be recorded before the previously-entered data are overwritten. At the rates disclosed above, the device of the present invention will typically store 80 frames of video data, together with the associated audio and acceleration data, for a total of 20 seconds of event history. Nevertheless, these numbers are only exemplary, as it is anticipated that improvements in high-density, low-cost memory will enable substantial increases in capacity at minimal additional cost.

In addition to acceleration data exceeding a predetermined threshold, the triggering event can be defined as activation of a so-called "panic button" 58 by an operator such as the vehicle driver. Thus, if the driver presses button 58, CPU 34 terminates data acquisition and copies the contents of the circular data buffer defined by DRAM 38 into memory 56. Panic button 58 may be particularly useful in taxicabs, buses and similar commercial vehicles in which the driver may wish to record the actions of a passenger. In other embodiments, the triggering event can be defined in still other ways, such as by activation of a security system protecting the vehicle against theft or vandalism.

Data capture can include not only storage of signals representing acquired data in memory but also, in addition or alternatively, transmittal of such signals to a remote location. Preferably, the signals are transmitted in real-time, i.e., immediately following the triggering event. A cellular telephone and modem 60 can transmit the digital signals to a suitable receiver (not shown) that is coupled to the telephone network. Cellular telephone and modem 60 and its antenna 62 are, like all other electronics and associated elements of device 10 described above, disposed inconspicuously and securely inside housing 18. The complete integration of these elements within housing 18 deters theft and tampering and does not inhibit surreptitious recording of passengers or would-be thieves. Furthermore, this location harmonizes with the location of device 10 on windshield 14 or nearby because windshield 14 is more transparent to radio frequency energy than areas of automobile 12 enclosed by metal. Although in the illustrated embodiment the transmitter is cellular, in other embodiments that include a transmitter it may be any suitable type of radio transmitter or even an infrared link or similar short-range transmitter. An infrared link is contemplated in embodiments in which the acquired data are not transmitted in real-time as described above, but rather are transmitted after the triggering event. For example, personnel investigating a collision may be provided with suitable receivers (not shown) that interrogate the vehicle data recording device via such an infrared link to retrieve the contents of its memory. Also, a programming unit (not shown) coupled by an infrared link to the recording device could be used to reset it or reprogram it.

Two other buttons 64 and 66 can be used by an operator to initiate and control the retrieval of stored data. In response to activation of buttons 64 and 66 in a predetermined manner, CPU 34 causes memory 56 to be addressed in sequence and provide the stored data on the data bus. CPU 34 also controls a video digital-to-analog (D/A) converter 68 and an audio D/A converter 70, causing them to convert the data signals read from memory 56 to analog format. A video signal representing the stored video imagery data is provided at a video output connector 72. By connecting a video monitor (not shown) to connector 72, one can view the recorded imagery. An audio signal representing the stored audio data is provided at an audio output connector 74. By connecting a speaker (not shown) to connector 74, one can listen to the recorded sound. A data connector 76 is also included that provides access to the data on the data bus, either directly or via suitable input/output interface circuitry (not shown). Device 10 can be programmed via connector 76 as well. Although these connectors are included in the illustrated embodiment, as described above, in other embodiments the device may not have such readily accessible outputs and may provide access to the recorded data only by means of a transmitter and receiver.

The recorded data streams are preferably output in "correlated packets" of data that are associated with the sample time for a single image frame. For example, if the memory playback is advanced by a single frame, then in the four-frames-per-second example 0.25 seconds of audio data and the related G-force data will also be retrieved. For the other rates disclosed above, different sized packets will be obtained and played. When the device retrieves data at a "normal" playback mode, the data display will present a substantially continuous, substantially "real time" stream.

The active electronic elements of device 10 receive power from a power supply circuit 78. Power supply circuit 78 can receive power from the electrical system of vehicle 12 via a suitable cable 80 (see FIG. 1) or from a backup battery 82. Cable 80 can have multiple conductors, some of which carry this power signal and others of which carry signals from other vehicle systems and sensors that provide data to device 10 for recording as described above.

CPU 34 can control a light-emitting diode (LED) 84 to provide status information, such as whether device 10 is powered-up and otherwise operational or, alternatively, whether a triggering event has occurred. The convenient location of LED 84 and buttons 58, 64 and 66 where the rear-view mirror is normally situated in an automobile promotes ease of operation of device 10 by a driver of vehicle 12.

Figure 2:
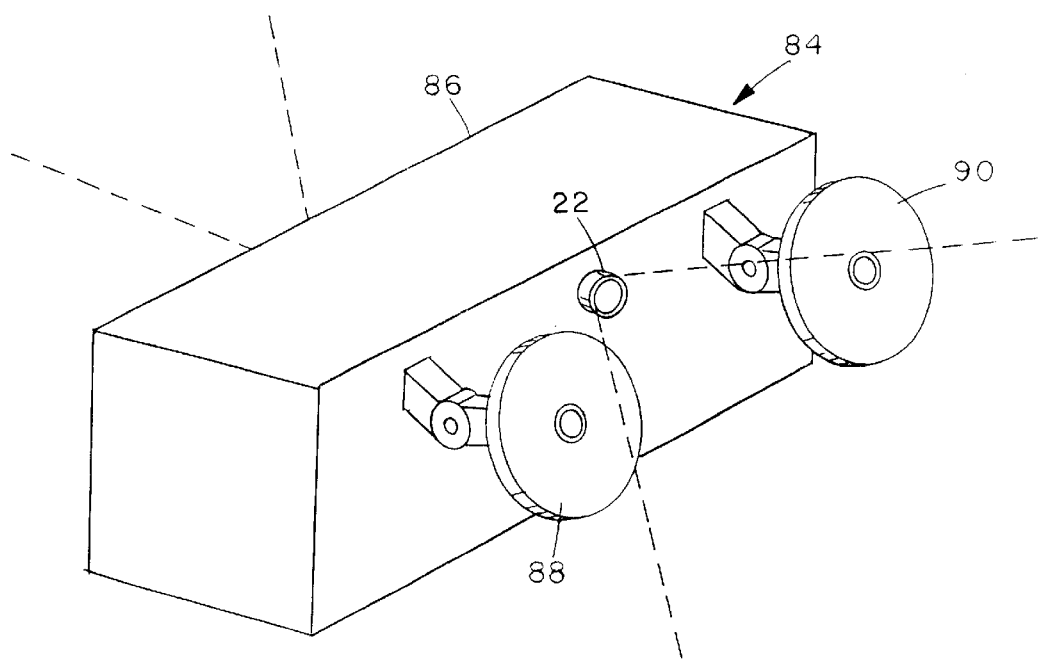
FIG. 2 is a perspective view of a vehicle data recorder device of the present invention with suction-cup mounts for mounting to an automobile windshield.

As illustrated in FIG. 2, in an alternative embodiment a data recorder device 84 of the present invention has an enclosure 86 that contains all of the electronics and associated elements described above with respect to FIG. 3. In this embodiment, device 84 does not include a mirror or function as a rear-view mirror. Nevertheless, it can be mounted to windshield 14 by means of elastomeric suction cups 88 and 90. In still other embodiments, it can be mounted to windshield 14 by means of a suitable adhesive, double-sided adhesive tape, or VELCRO-type hook and pile fasteners (not shown). Cameras 22 and 24 have fields-of-view, indicated generally by the dashed lines, that extend forwardly and rearwardly of vehicle 12 when attached to windshield 14.

The present invention provides a vehicle data recorder device that is fully integrated in a single enclosure and does not require cabling to connect cameras with remotely located recording devices. In some embodiments the device may provide a rear-view mirror function and can be used in place of a conventional rear-view mirror. In such embodiments, the recording nature of the device is advantageously not immediately conveyed to taxicab passengers, would-be thieves or others whose actions the device may be intended to monitor. Furthermore, the convenient location of the device on or near the windshield promotes ease of operation and facilitates radio and other remote transmission of data through the windshield. It also deters tampering because removal of the device, particularly in rear-view mirror embodiments, will be immediately apparent to any driver as well as persons outside the vehicle.

Obviously, other embodiments and modifications of the present invention will occur readily to those of ordinary skill in the art in view of these teachings. For example, alternative methods of mounting the device to a windshield or the surrounding area will occur to such persons as natural extensions and variations of the described methods of adhering a rear-view mirror device to the windshield and mounting a device by means of suction cups. Therefore, this invention is to be limited only by the following claims, which include all such other embodiments and modifications when viewed in conjunction with the above specification and accompanying drawings.

What is claimed is:

1. A vehicle-mounted device for capturing video imagery in response to a triggering event, comprising:
   a housing;
   an image sensor mounted to said housing, said image sensor sensing optical phenomena representing said video imagery;
   a data sensor circuit within said housing and in part responsive to said triggering event; and
   a capture circuit within said housing; said capture circuit comprising:
      a non-volatile memory;
      a volatile, random-access memory configured as a continuous-loop buffer, said volatile memory coupled to said non-volatile memory and coupled to said image sensor; said volatile memory capturing a signal representing said video imagery from said image sensor in a first-in, first-overwritten manner, and, responsive to said data sensor circuit sensing a triggering event, terminating capture of said signal and copying the captured signal representing said a video imagery to said non-volatile memory.

2. The vehicle-mounted device claimed in claim 1, wherein said capture circuit terminates capture of said signal a predetermined time interval after occurrence of said triggering event.

3. The vehicle-mounted device claimed in claim 1, wherein said capture circuit comprises a digital recording circuit having a digital memory and records said signal representing said video imagery.

4. The vehicle-mounted device claimed in claim 3, wherein said capture circuit further records a signal representing data produced by said data sensor circuit.

5. The vehicle-mounted device claimed in claim 1, wherein said capture circuit comprises a transmitter transmitting a signal representing said video imagery to a remote location.

6. The vehicle-mounted device claimed in claim 5, wherein said transmitter transmits said signal in real-time.

7. The vehicle-mounted device claimed in claim 1, wherein said data sensor circuit comprises a sensor responsive to a change in force experienced by said device.

8. The vehicle-mounted device claimed in claim 7, wherein said data sensor circuit comprises a forward sensor responsive to a change in force experienced by said device in a direction substantially perpendicular to a direction of elongation of said housing and a lateral sensor responsive to a change in force experienced by said device in a direction substantially parallel to said direction of elongation of said housing.

9. The vehicle-mounted device claimed in claim 1, wherein said image sensor is disposed behind a mirror and senses said optical phenomena transmitted through a portion of said mirror.

10. The vehicle-mounted device claimed in claim 9, wherein said portion of said mirror is half-silvered and partially transmits and partially reflects said optical phenomena to provide said mirror with a uniformly mirrored appearance.

11. The vehicle-mounted device claimed in claim 9, wherein said portion of said mirror is transparent.

12. The vehicle-mounted device claimed in claim 1, wherein said image sensor is oriented to sense the optical phenomena impinging upon it from a direction substantially perpendicular to a direction of elongation of said housing.

13. The vehicle-mounted device claimed in claim 12, wherein said image sensor comprises first and second portions, said first portion oriented to sense the optical phenomena impinging upon it from a direction substantially perpendicular to a direction of elongation of said housing, said second portion oriented to sense the optical phenomena impinging upon it from a direction substantially perpendicular to a direction of elongation of said housing and axially opposite said direction from which said optical phenomena impinges upon said first portion.

14. The vehicle-mounted device claimed in claim 13, wherein said first portion of said image sensor is disposed behind a mirror and senses said optical phenomena transmitted through a portion of said mirror.

15. The vehicle-mounted device claimed in claim 1, wherein:
   said data sensor circuit further comprises a global positioning system (GPS) receiver identifying a geographic position of said vehicle-mounted device; and
   said capture circuit further records a signal representing said geographic position.

16. The vehicle-mounted device claimed in claim 1, wherein:
   said data sensor circuit further comprises a microphone; and
   said capture circuit further records a signal representing a sound impinging upon said microphone.

17. A vehicle-mounted device for capturing video imagery in response to a triggering event, comprising:

a housing having a generally elongated shape;

a rear-view mirror mounted to said housing and having a generally elongated shape;

an image sensor mounted to said housing, said image sensor sensing optical phenomena representing said video imagery;

a data sensor circuit within said housing and in part responsive to said triggering event; and a capture circuit within said housing; said capture circuit comprising:

a non-volatile memory; and a volatile, random-access memory configured as a continuous-loop buffer; said volatile memory coupled to said non-volatile memory and coupled to said image sensor; said volatile memory capturing a signal representing said video imagery from said image sensor in a first-in, first-overwritten manner, and, responsive to said data sensor circuit sensing a triggering event, terminating capture of said signal and copying the captured signal representing said video imagery to said non-volatile memory.

18. The vehicle-mounted device claimed in claim 17, wherein said capture circuit terminates capture of said signal a predetermined time interval after occurrence of said triggering event.

19. The vehicle-mounted device claimed in claim 17, wherein said capture circuit comprises a digital recording circuit having a digital memory and records said signal representing said video imagery.

20. The vehicle-mounted device claimed in claim 19, wherein said capture circuit further records a signal representing data produced by said data sensor circuit.

21. The vehicle-mounted device claimed in claim 17, wherein said capture circuit comprises a transmitter transmitting a signal representing said video imagery to a remote location.

22. The vehicle-mounted device claimed in claim 21, wherein said transmitter transmits said signal in real-time.

23. The vehicle-mounted device claimed in claim 17, wherein said data sensor circuit comprises a sensor responsive to a change in force experienced by said device.

24. The vehicle-mounted device claimed in claim 23, wherein said data sensor circuit comprises a forward sensor responsive to a change in force experienced by said device in a direction substantially perpendicular to a direction of elongation of said housing and a lateral sensor responsive to a change in force experienced by said device in a direction substantially parallel to said direction of elongation of said housing.

25. The vehicle-mounted device claimed in claim 17, wherein said image sensor is disposed behind said mirror and senses said optical phenomena transmitted through a portion of said mirror.

26. The vehicle-mounted device claimed in claim 25, wherein said portion of said mirror is half-silvered and partially transmits and partially reflects said optical phenomena to provide said mirror with a uniformly mirrored appearance.

27. The vehicle-mounted device claimed in claim 25, wherein said portion of said mirror is transparent.

28. The vehicle-mounted device claimed in claim 17, wherein said image sensor is oriented to sense the optical phenomena impinging upon it from a direction substantially perpendicular to a direction of elongation of said housing.

29. The vehicle-mounted device claimed in claim 18, wherein said image sensor comprises first and second portions, said first portion oriented to sense the optical phenomena impinging upon it from a direction substantially perpendicular to a direction of elongation of said housing, said second portion oriented to sense the optical phenomena impinging upon it from a direction substantially perpendicular to a direction of elongation of said housing and axially opposite said direction from which said optical phenomena impinge upon said first portion.

30. The vehicle-mounted device claimed in claim 29, wherein said first portion of said image sensor is disposed behind said mirror and senses said optical phenomena transmitted through a portion of said mirror.

31. The vehicle-mounted device claimed in claim 17, wherein:

said data sensor circuit further comprises a global positioning system (GPS) receiver identifying a geographic position of said vehicle-mounted device; and said capture circuit further records a signal representing said geographic position.

32. The vehicle-mounted device claimed in claim 17, wherein:

said data sensor circuit further comprises a microphone; and said capture circuit further records a signal representing a sound impinging upon said microphone.

33. A method for capturing video imagery in a vehicle-mounted system in response to a triggering event, said system comprising a rear-view mirror device mounted upon a windshield of a vehicle, said rear-view mirror device having a housing with a generally elongated shape, a mirror assembly mounted to said housing and having a generally elongated shape, an image sensor mounted to said housing and sensing optical phenomena representing said video imagery, a data sensor circuit within said housing, and a capture circuit within said housing; said capture circuit comprising: a non-volatile memory; and a volatile, random-access memory configured as a continuous-loop buffer, said volatile memory coupled to said non-volatile memory, the method comprising the steps of:

using said image sensor sensing optical phenomena transmitted through a portion of said mirror assembly and representing said video imagery; using said capture circuit capturing said video imagery in said volatile, random-access memory in a first-in, first-overwritten manner, and, responsive to said data sensor circuit sensing a triggering event, terminating capture of a signal representing said video imagery and copying the captured signal representing video imagery to said non-volatile memory.

34. The method claimed in claim 33, further comprising the step of transmitting said signal representing said video imagery to a remote location.

35. The method claimed in claim 33, wherein said step of terminating capture of said signal representing said video imagery comprises terminating capture of said signal in response to a change in force experienced by said device.

36. A method for capturing video imagery in a vehicle-mounted system in response to a triggering event, said system comprising a rear-view mirror device mounted upon a windshield of a vehicle, said rear-view mirror device having a housing with a generally elongated shape, a mirror assembly mounted to said housing and having a generally elongated shape, an image sensor mounted to said housing and sensing optical phenomena representing said video imagery, a data sensor circuit within said housing, and a capture circuit within said housing; said capture circuit comprising: a non-volatile memory; and a volatile, random-access memory configured as a continuous-loop buffer; said volatile memory coupled to said non-volatile memory, the method comprising the steps of:

using said image sensor sensing optical phenomena representing said video imagery impinging upon it from a direction substantially perpendicular to a direction of elongation of said housing and forwardly through said windshield of said vehicle and said video imagery impinging upon it from a direction substantially perpendicular to a direction of elongation of said housing and rearwardly with respect to said vehicle; using said capture circuit capturing said video imagery in said volatile, random-access memory in a first-in, first-overwritten manner, and, responsive to said data sensor circuit sensing a triggering event, terminating capture of a signal representing said video imagery and copying the captured signal representing video imagery to said non-volatile memory.

37. The method claimed in claim 36, further comprising the step of transmitting said signal representing said video imagery to a remote location.

38. The method claimed in claim 36, wherein said step of terminating capture of said signal representing said video imagery comprises terminating capture of said signal in response to a change in force experienced by said device.

39. A method for mounting a system for capturing video imagery in response to a triggering event, comprising the steps of mounting upon a vehicle windshield a device comprising a housing, an image sensor mounted to said housing to sensing optical phenomena representing said video imagery, a data sensor circuit within said housing responsive to said triggering event, and a capture circuit within said housing; said capture circuit comprising: a non-volatile memory; and a volatile, random-access memory configured as a continuous-loop buffer; said volatile memory coupled to said non-volatile memory and coupled to said image sensor using; using said volatile memory capturing a signal representing said video imagery from said image sensor in a first-in, first-overwritten manner, and, responsive to said data sensor circuit sensing a triggering event, terminating capture of said signal and copying the captured signal representing said video imagery to said non-volatile memory.

40. The method claimed in claim 39, wherein said housing has a generally elongated shape, said device further comprises a suction-cup attached to said housing and a mirror having a generally elongated shape mounted to said housing, and said mounting step comprises the step of adhering said device to said windshield.

41. The method claimed in claim 39, wherein said mounting step comprises the step of engaging said suction-cup upon said windshield.

* * * * *

(12) EX PARTE REEXAMINATION CERTIFICATE (9887th)
United States Patent
Rayner

(10) Number: US 6,389,340 C1
(45) Certificate Issued: Oct. 21, 2013

(54) VEHICLE DATA RECORDER

(75) Inventor: Gary A. Rayner, San Diego, CA (US)

(73) Assignee: Leader Ventures, LLC, San Francisco, CA (US)

Reexamination Request:
No. 90/011,951, Oct. 11, 2011

Reexamination Certificate for:
Patent No.: 6,389,340
Issued: May 14, 2002
Appl. No.: 09/405,857
Filed: Sep. 24, 1999

Related U.S. Application Data

(63) Continuation-in-part of application No. 09/020,700, filed on Feb. 9, 1998, now abandoned.

(51) Int. Cl.
*G07C 5/00* (2006.01)
*G07C 5/08* (2006.01)

(52) U.S. Cl.
USPC ......... 701/32.4; 340/438; 348/148; 701/32.2; 701/33.4

(58) Field of Classification Search
None
See application file for complete search history.

(56) References Cited

To view the complete listing of prior art documents cited during the proceeding for Reexamination Control Number 90/011,951, please refer to the USPTO's public Patent Application Information Retrieval (PAIR) system under the Display References tab.

*Primary Examiner* — Zoila Cabrera

(57) ABSTRACT

A self-contained device for capturing video imagery in response to a triggering event may include a mirror and be mounted to a vehicle windshield in place of a conventional rear-view mirror. The device includes a housing in which the electronics and related elements of the invention are contained. These elements include one or more data sensors, at least one of which is an image sensor. Also included are a data sensor circuit and a capture circuit. The data sensor circuit responds to the triggering event, and may include data sensors coupled to vehicle systems such as a speedometer, tachometer, brake, turn signals or the like, or other data sensors such as an accelerometer or a vehicle position sensor. The triggering event may be, for example, a sudden change in acceleration indicative of an impending collision, or it may be a change in the signal provided by any such data sensor, including the image sensor. The capture circuit is coupled to the image sensor and captures a signal representing the video imagery by recording it in a digital memory, by transmitting it to a remote location, or by other suitable means. The capture circuit terminates capture of the signal in response to the data sensor circuit sensing a triggering event. The captured data thus describe circumstances leading up to the time of the triggering event. The data can be analyzed to help police, insurance or other investigative personnel understand those circumstances.

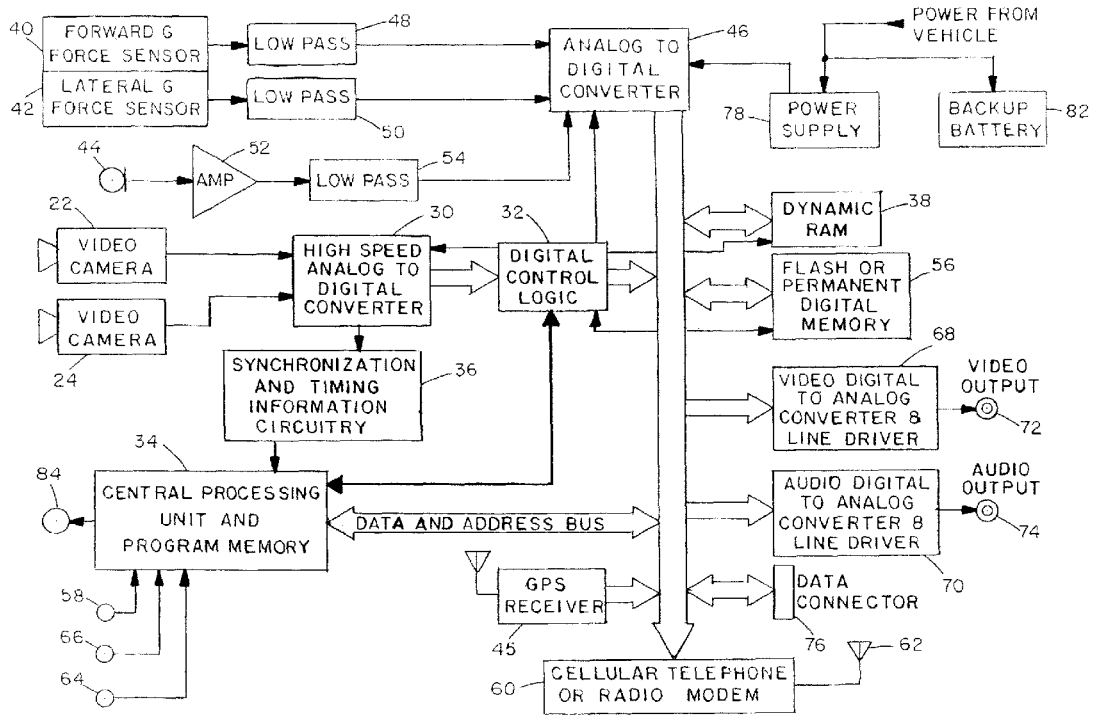

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-8, 12, 13, 15, 16 and 39 are cancelled.

New claims 42-44 are added and determined to be patentable.

Claims 9-11, 14, 17-38, 40 and 41 were not reexamined.

*42. A vehicle-mounted device for capturing video imagery in response to a triggering event, comprising:*
  *a housing;*
  *an image sensor mounted to said housing, said image sensor sensing optical phenomena representing said video imagery;*
  *a data sensor circuit within said housing and in part responsive to said triggering event; and*
  *a capture circuit within said housing; said capture circuit comprising:*
    *a non-volatile memory comprising addressable digital storage; and*
    *a volatile, dynamic random-access memory configured as a continuous-loop buffer, said volatile memory coupled to said non-volatile memory and coupled to said image sensor; said volatile memory capturing a signal representing said video imagery from said image sensor in a first-in, first-overwritten manner, and, responsive to said data sensor circuit sensing the triggering event, terminating capture of said signal and copying the captured signal representing said video imagery to said non-volatile memory, wherein the non-volatile memory and the volatile, random-access memory comprise a two-tier system with a first tier that records data using a continuous-loop scheme by employing wrap-around memory addressing, in which the highest memory location in a predetermined addressing sequence is adjacent or next to a lowest and a second tier that stores the data in response to the triggering event, wherein in response to the triggering event, the second tier provides more permanent storage for data than is provided for data stored in the first tier, and wherein data stored in the second tier is only overwritten in response to a system reset operation.*

*43. A vehicle-mounted device for capturing video imagery in response to a triggering event, comprising:*
  *a housing;*
  *an image sensor mounted to said housing, said image sensor sensing optical phenomena representing said video imagery;*
  *a data sensor circuit within said housing and in part responsive to said triggering event; and*
  *a capture circuit within said housing; said capture circuit comprising:*
    *a non-volatile memory comprising addressable digital storage; and*
    *a volatile, dynamic random-access memory configured as a continuous-loop buffer, said volatile memory coupled to said non-volatile memory and coupled to said image sensor; said volatile memory capturing a signal representing said video imagery from said image sensor in a first-in, first-overwritten manner, and, responsive to said data sensor circuit sensing the triggering event, terminating capture of said signal and copying the captured signal representing said video imagery to said non-volatile memory, wherein the non-volatile memory and the volatile, random-access memory comprise a two-tier system with a first tier that records data using a continuous-loop scheme by employing wrap-around memory addressing, in which the highest memory location in a predetermined addressing sequence is adjacent or next to a lowest and a second tier that stores the data in response to the triggering event, wherein in response to the triggering event, the second tier provides more permanent storage for data than is provided for data stored in the first tier, wherein data stored in the second tier is only overwritten in response to a system reset operation, and wherein security measures prevent an inadvertent or unauthorized resetting operation from being performed.*

*44. A vehicle-mounted device for capturing video imagery in response to a triggering event, comprising:*
  *a housing;*
  *an image sensor mounted to said housing, said image sensor sensing optical phenomena representing said video imagery;*
  *a data sensor circuit within said housing and in part responsive to said triggering event; and*
  *a capture circuit within said housing; said capture circuit comprising:*
    *a non-volatile memory comprising addressable digital storage; and*
    *a volatile, dynamic random-access memory configured as a continuous-loop buffer, said volatile memory coupled to said non-volatile memory and coupled to said image sensor; said volatile memory capturing a signal representing said video imagery from said image sensor in a first-in, first-overwritten manner, and, responsive to said data sensor circuit sensing the triggering event, terminating capture of said signal and copying the captured signal representing said video imagery to said non-volatile memory, wherein the non-volatile memory and the volatile, random-access memory comprise a two-tier system with a first tier that records data using a continuous-loop scheme by employing wrap-around memory addressing, in which the highest memory location in a predetermined addressing sequence is adjacent or next to a lowest and a second tier that stores the data in response to the triggering event, wherein in response to the triggering event, the second tier provides more permanent storage for data than is provided for data stored in the first tier, wherein data stored in the second tier is only overwritten in response to a system reset operation, wherein security measures prevent an inadvertent or unauthorized resetting operation from being performed, and wherein the security measures include placing a reset button inside of the housing.*

\* \* \* \* \*